US012697875B1

(12) United States Patent
Austin et al.

(10) Patent No.: US 12,697,875 B1
(45) Date of Patent: Aug. 4, 2026

(54) AUGMENTED VIEW PROJECTION OF TURNING LANE CORNERS

(71) Applicant: TOYOTA MOTOR ENGINEERING & MANUFACTURING NORTH AMERICA, INC., Plano, TX (US)

(72) Inventors: Benjamin Piya Austin, Saline, MI (US); Heishiro Toyoda, Mountain View, CA (US); Joshua E. Domeyer, Madison, WI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 19/046,584

(22) Filed: Feb. 6, 2025

(51) Int. Cl.
*B60Q 9/00* (2006.01)
*B60K 35/235* (2024.01)
*G08G 1/16* (2006.01)

(52) U.S. Cl.
CPC ...... *B60K 35/235* (2024.01); *B60K 2360/166* (2024.01); *B60K 2360/177* (2024.01)

(58) Field of Classification Search
CPC ..................................................... B60K 35/60
See application file for complete search history.

(56) References Cited

U.S. PATENT DOCUMENTS

| | | | |
|---|---|---|---|
| 9,047,703 B2 | 6/2015 | Beckwith et al. | |
| 9,064,420 B2 | 6/2015 | Beckwith et al. | |
| 9,588,340 B2 | 3/2017 | Ng-Thow-Hing et al. | |
| 9,690,104 B2 | 6/2017 | Kim | |
| 9,771,021 B1* | 9/2017 | Lindsay ................. | B60Q 1/525 |
| 10,303,178 B1* | 5/2019 | Gutmann .............. | G01S 13/931 |
| 10,745,022 B2 | 8/2020 | Ko | |
| 11,238,737 B2* | 2/2022 | Hanafi ................... | B60Q 1/525 |
| 2015/0331423 A1* | 11/2015 | Volger ................. | G05D 1/6484 |
| | | | 701/25 |
| 2015/0336502 A1* | 11/2015 | Hillis ................... | G05D 1/0088 |
| | | | 701/23 |
| 2023/0304800 A1 | 9/2023 | Pottier et al. | |

FOREIGN PATENT DOCUMENTS

| | | | |
|---|---|---|---|
| JP | 7365500 B2 | 10/2023 | |
| WO | WO 2018/172886 A1 | 9/2018 | |

* cited by examiner

*Primary Examiner* — Nan-Ying Yang
(74) *Attorney, Agent, or Firm* — HAYNES AND BOONE, LLP

(57) ABSTRACT

An augmented reality system projects a sharp corner image onto rounded corners of turning lanes (e.g., curved ingress, egress lanes) from the eye point of the driver, when in the presence of pedestrian activity. The projected sharp corner image will cause the driver to slow down and/or alter the driving path and, thus, minimize or reduce the occurrence of road incidents at the intersection.

20 Claims, 5 Drawing Sheets

300

AUGMENTED VIEW PROJECTION OF TURNING LANE CORNERS

TECHNICAL FIELD

The subject matter described herein relates generally to vehicle safety and, more particularly, to systems and methods that provide augmented views of turning lane corners to increase pedestrian safety at intersections.

BACKGROUND

Most pedestrian fatalities occur near intersections, especially when the roadway corners of the intersection are rounded. In such cases, the rounded corners allow for right-hand turns at higher speeds which, in turn, increases the risk of pedestrian accidents.

SUMMARY

The various embodiments described herein provide sharp corner projection systems for vehicles. A general embodiment of the present disclosure provides a computer-implemented method to provide an augmented view of a turning lane corner for a driver of a vehicle. As the vehicle approaches a turn at a rounded corner of a traffic intersection, network sensors detect a presence of one or more pedestrians within proximity of the intersection. Based upon the detected presence of the pedestrian, an augmented reality device projects a sharp corner image onto the rounded turning lane corner at an eye point of the driver.

Another illustrative embodiment provides a system to provide an augmented view of a turning lane corner for a driver of a vehicle. The system includes an augmented reality device and a processor communicably coupled to the augmented reality device. The processor includes a memory and is configured to perform operations comprising as the vehicle approaches a turn at a rounded corner of a traffic intersection, detecting, using network sensors, a presence of one or more pedestrians within proximity of the intersection. The processor then initializes an augmented reality device to project a sharp corner image onto the rounded corner at an eye point of the driver, based upon the detected presence of the pedestrian.

Yet another illustrative embodiment provides a vehicle that includes a processor communicably coupled to an augmented reality device. The processor includes a memory and is configured to perform operations comprising: as the vehicle approaches a turn at a rounded corner of a traffic intersection, detecting, using network sensors, a presence of one or more pedestrians within proximity of the intersection. Based upon the detected presence of the pedestrian, the processor initializes an augmented reality device to project a sharp corner image onto the rounded corner at an eye point of the driver.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the present disclosure, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

The present disclosure is generally directed to systems and methods to provide augmented views of a turning lane corner for a driver of a vehicle. In the interest of clarity, not all features of an actual implementation or methodology are described in this specification. It will of course be appreciated that in the development of any such actual embodiment, numerous decisions about the implementation must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. Further aspects and advantages of the various embodiments and related methodologies of the disclosure will become apparent from consideration of the following description and drawings.

Embodiments discussed herein describe a system that projects a sharp corner image onto rounded corners of turning lanes (e.g., curved ingress, egress lanes) from the eye point of the driver, when in the presence of pedestrian activity. These augmented views of the turning lanes when pedestrians are present provide for a safer environment where vehicles have a tendency to proceed around the curve quickly when turning without seeing around the curve. The images are projected by an augmented reality device such as, for example, roadway infrastructure (e.g., streetlamp mounted projection system) or augmented reality ("AR") windshields of the vehicle. The projected sharp corner image will cause the driver to slow down and, thus, minimize or reduce the occurrence of road incidents at the intersection.

Figure 1:
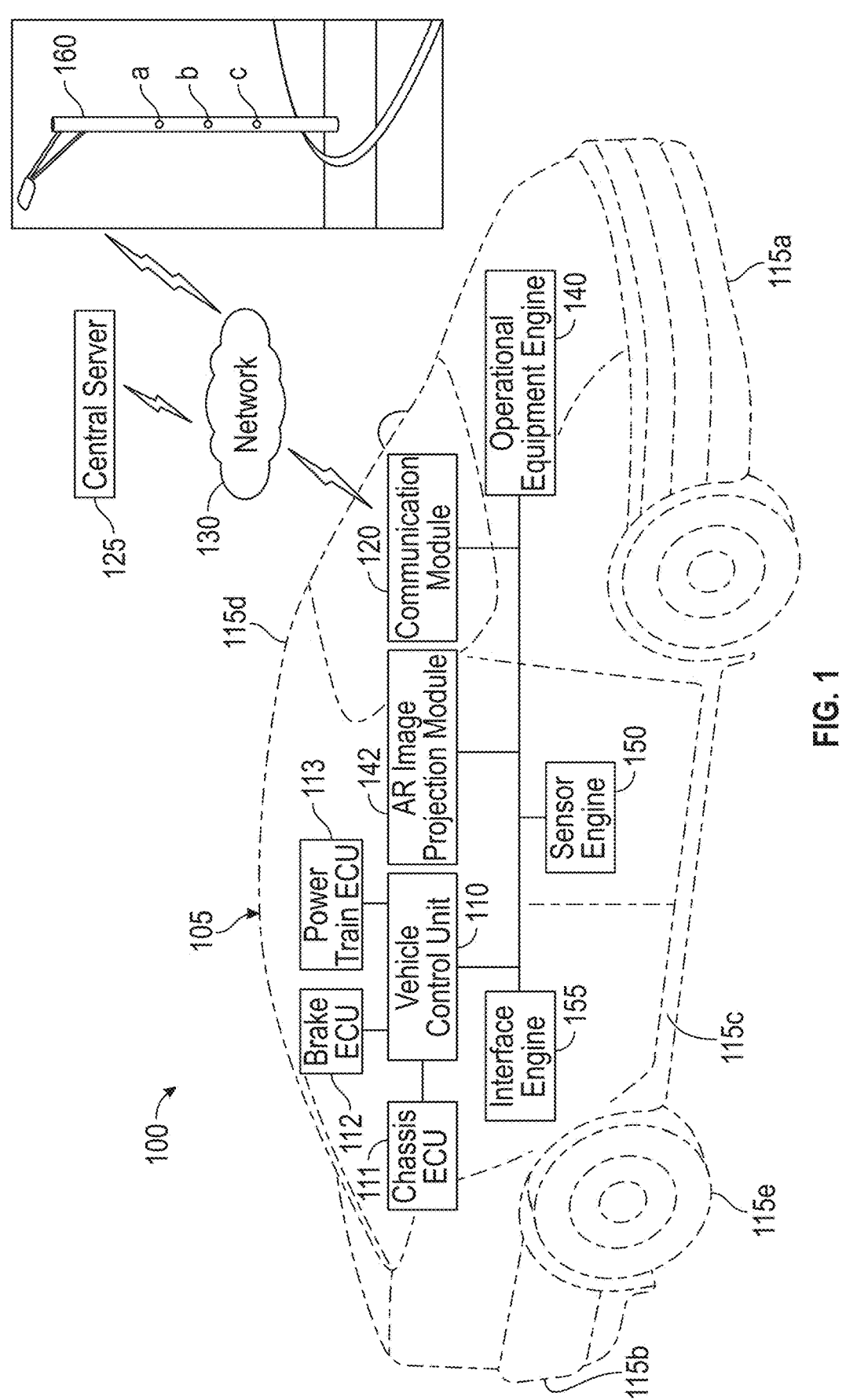
FIG. 1 is a diagrammatic illustration of a augmented reality ("AR") image projection system in accordance with at least one embodiment of the present disclosure.

FIG. 1 is a diagrammatic illustration of an augmented reality ("AR") projection system in accordance with at least one embodiment of the present disclosure. In an example, an AR projection system 100 is referred to by the reference numeral 100 and includes a vehicle 105, such as an automobile. The vehicle 105 may include a front portion 115*a* (including a front bumper), a rear portion 115*b* (including a rear bumper), a right side portion 115*c* (including a right front quarter panel, a right front door, a right rear door, and a right rear quarter panel), a left side portion 115*d* (including a left front quarter panel, a left front door, a left rear door, and a left rear quarter panel), and wheels 115*e*.

A communication module 120 is operably coupled to, and adapted to be in communication with, the vehicle control unit 110. The communication module 120 is adapted to communicate wirelessly with a central server 125 via a network 130 (e.g., a 3G network, a 4G network, a 5G network, a Wi-Fi network, or the like). The central server 125 may provide information and services including but not limited to include location, mapping, route or path, traffic-related data, crash-related data for a roadway intersection, and topography information.

An operational equipment engine 140 is operably coupled to, and adapted to be in communication with, the vehicle control unit 110 and AR image projection module 142 which is utilized to perform the methods described herein. A sensor engine 150 is operably coupled to, and adapted to be in communication with, the vehicle control unit 110 and AR image projection module 142. The sensor engine 150 is adapted to monitor various components of, for example, the operational equipment engine 140 and one or more sensors on the vehicle (not shown) or located remotely from the vehicle 105, as will be described in further detail below.

An interface engine 155 is operably coupled to, and adapted to be in communication with, the vehicle control unit 110. In addition to, or instead of, being operably coupled to, and adapted to be in communication with, the vehicle control unit 110, the communication module 120, the operational equipment engine 140, the sensor engine 150, and/or the interface engine 155 may be operably coupled to, and adapted to be in communication with, another of the components via wired or wireless communication (e.g., via an in-vehicle network). In some examples, the vehicle control unit 110 is adapted to communicate with the communication module 120, the operational equipment engine 140, the sensor engine 150, and the interface engine 155 to at least partially control the interaction of data with and between the various components of the AR projection system 100.

The term "engine" or "module" is meant herein to refer to an agent, instrument, or combination of either, or both, agents and instruments that may be associated to serve a purpose or accomplish a task-agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 110, the communication module 120, the network 130, or a central server 125.

In this example, the vehicle 105 also includes a chassis electronic control unit (ECU) 111 which controls elements of the vehicle's suspension system, a brake ECU 112 which controls the braking system or elements thereof, a power train ECU 113 (variously known as an engine ECU, power plant ECU, motor ECU, or transmission ECU) that controls elements of the motor 195 and drivetrain 200, and sensor engine 150.

A reader of ordinary skill in the art will understand that other components or arrangements of components may be found in a vehicle 105, and that the same general principles apply to electric vehicles, internal combustion vehicles, and hybrid vehicles. For example, a power train ECU 113 may control both motor and transmission components. Alternatively, a separate motor ECU and transmission ECU may exist, or some functions of a motor ECU or transmission ECU may be performed by the VCU 110.

As mentioned above, AR image projection module 142 is utilized to implement methods of the present disclosure through communication with sensors forming part of AR projection system 100. The sensors are used, at least in part, to detect the presence of one or more pedestrians as vehicle 105 approaches an intersection. In one illustrative embodiment, sensors are positioned on vehicle 105 such as, for example, cameras, LIDAR or RADAR-enabled sensors. In other embodiments, the sensors may be positioned on roadway infrastructure 160 which is in communication with vehicle 105 and central server 125 via network 130. Accordingly, pedestrians can be detected by sensors on board vehicle 105 or sensors a,b,c forming part of roadway infrastructure 160. Although three sensors are shown, more or less may be used. Sensors a,b,c may also be a variety of sensors including, for example, cameras, LIDAR or RADAR-enabled sensors.

Figure 2:
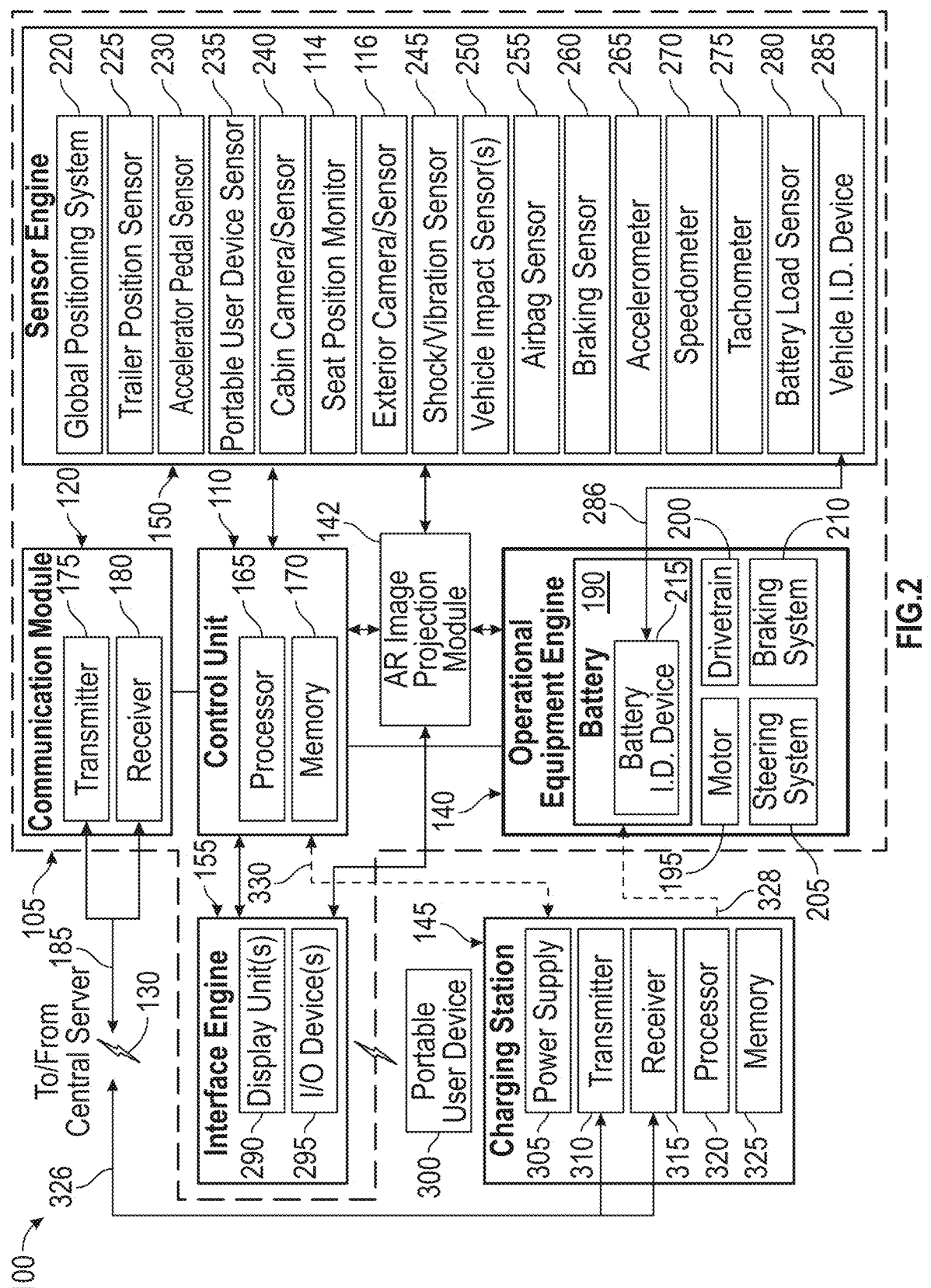
FIG. 2 is a diagrammatic illustration, in a block-diagram form, of at least a portion of the AR image projection system of FIG. 1, in accordance with at least one embodiment of the present disclosure.

FIG. 2 is a diagrammatic illustration, in a block-diagram form, of at least a portion of the AR projection system 100 of FIG. 1, in accordance with at least one embodiment of the present disclosure. It is worth noting that the components of the vehicle 105 may be located either permanently or temporarily as a part of the vehicle 105. The vehicle control unit (VCU) 110 includes a processor 165 and a memory 170. In some examples, the communication module 120, which is operably coupled to, and adapted to be in communication with, the vehicle control unit 110, includes a transmitter 175 and a receiver 180. In some examples, one or the other of the transmitter 175 and the receiver 180 may be omitted according to the particular application for which the communication module 120 is to be used. In other examples, the transmitter 175 and receiver 180 are combined into a single transceiver that performs both transmitting and receiving functions.

In some examples, the operational equipment engine 140, which is operably coupled to, and adapted to be in communication with, the vehicle control unit 110, includes a plurality of devices configured to facilitate driving of the vehicle 105. In this regard, the operational equipment engine 140 may be designed to exchange communication with the vehicle control unit 110, so as to not only receive instructions, but to provide information on the operation of the operational equipment engine 140. For example, the operational equipment engine 140 may include a vehicle battery 190, a motor 195, a drivetrain 200, a steering system 205, and a braking system 210. In some vehicles, the vehicle battery 190 may provide electrical power to the motor 195 to drive the wheels 115*e* of the vehicle 105 via the drivetrain 200. In some examples, instead of or in addition to providing power to the motor 195 to drive the wheels 115*e* of the vehicle 105 via the drivetrain or transmission 200, the vehicle battery 190 provides electrical power to another component of the operational equipment engine 140, the vehicle control unit 110, the communication module 120, the sensor engine 150, the interface engine 155, or any combination thereof. In some examples, the vehicle battery 190 includes a battery identification device 215.

The battery identification device 215 is adapted to communicate with one or more components of the sensor engine 150, and stores data identifying the vehicle battery 190 such as, for example, manufacturing information (e.g., production date, production facility, etc.), battery characteristic(s) information, battery identification number information, electric vehicle compatibility information, or the like. In some embodiments, the motor is an internal combustion motor and the battery operates a starter.

In some examples, the sensor engine 150, which is operably coupled to, and adapted to be in communication with, the vehicle control unit 110 and AR image projection module 142, includes devices such as sensors, cameras, meters, detectors, or other devices configured to measure or sense a parameter related to a driving operation of the vehicle 105 or the presence of a pedestrian in the vicinity of vehicle 105 (e.g., at a roadway intersection). For example, the sensor engine 150 may include a global positioning system 220 that can be used to determine road grade, a brake pedal sensor 225, an accelerator pedal sensor 230, a portable user device sensor 235 that can be used to determine when a certain driver or user is in the vicinity or inside vehicle 105, a cabin camera/sensor 240 used to monitor the position of persons within vehicle 105, a seat position monitor 114 used to control and monitor the position of the vehicle seats, a shock/vibration sensor 245, a vehicle impact sensor 250, an airbag sensor 255, a braking sensor 260, an accelerometer 265 (which may in some cases also serve as an inclinometer), a speedometer 270, a tachometer 275, a battery load sensor 280, a vehicle identification device 285, one or more exterior cameras or sensors 116 that can be used to monitor traffic, the presence of pedestrians in the vicinity of vehicle 105 and/or weather conditions around the vehicle, or to determine when vehicle 105 approaches a parking space, or any combinations thereof. In some instances, traffic or weather patterns may be monitored from outside the vehicle and received from server 125 via network 130.

As mentioned above, AR projection system 100 includes one or more exterior cameras/sensors 116 to detect the presence of pedestrians in the vicinity of vehicle 105. Such cameras/sensors 116 may be located on the rear of the vehicle near the rear liftgate, trunk or truck bed door latch. In yet other embodiments, the camera/sensors 116 may be positioned on side mirrors, any exterior wall around the truck bed, door panels, front or rear bumper, etc.

Further, the sensors or other detection devices 116 may be configured to sense or detect activity, conditions, and circumstances in an area to which the device has access, e.g., ambient conditions, conditions within or outside the vehicle cabin, etc. Sub-components of the sensor engine 150 may be deployed at any operational area where information on the driving of the vehicle 105 may occur. Some readings from the sensor engine 150 may be fed back to the vehicle control unit 110 and AR image projection module 142. Stored and reported performance data may include the sensed data, or may be derived, calculated, or inferred from sensed data. The vehicle control unit 110 may send signals to the sensor engine 150 to adjust the calibration or operating parameters of the sensor engine 150 in accordance with a control program in the vehicle control unit 110. The vehicle control unit 110 is adapted to receive and process performance data from the sensor engine 150 or from other suitable source(s), and to monitor, store (e.g., in the memory 170), and/or otherwise process (e.g., using the processor 165) the received performance data.

The braking sensor 260 is adapted to monitor usage of the vehicle 105's braking system 210 (e.g., an antilock braking system 210) and to communicate the braking information to the vehicle control unit 110. The accelerometer 265 is adapted to monitor acceleration of the vehicle 105 and to communicate the acceleration information to the vehicle control unit 110. The accelerometer 265 may be, for example, a two-axis accelerometer 265 or a three-axis accelerometer 265, and may also serve as an inclinometer or tilt sensor. In some examples, the accelerometer 265 is associated with an airbag of the vehicle 105 to trigger deployment of the airbag. The speedometer 270 is adapted to monitor speed of the vehicle 105 and to communicate the speed information to the vehicle control unit 110. In some examples, the speedometer 270 is associated with a display unit of the vehicle 105 such as, for example, a display unit of the interface engine 155, to provide a visual indication of vehicle speed to a driver of the vehicle 105. The tachometer 275 is adapted to monitor the working speed (e.g., in revolutions-per-minute) of the vehicle 105's motor 195 and to communicate the angular velocity information to the vehicle control unit 110. In some examples, the tachometer 275 is associated with a display unit of the vehicle 105 such as, for example, a display unit of the interface engine 155, to provide a visual indication of the motor 195's working speed to the driver of the vehicle 105. The battery load sensor 280 is adapted to monitor charging, discharging, and/or overcharging of the vehicle battery 190 and to communicate the charging, discharging, and/or overcharging information to the vehicle control unit 110.

In some examples, the vehicle identification device 285 stores data identifying the vehicle 105 such as, for example, manufacturing information (e.g., make, model, production date, production facility, etc.), vehicle characteristic(s) information, vehicle identification number ("VIN") information, battery compatibility information, or the like. The vehicle identification device 285 is adapted to communicate with the battery identification device 215 (or vice versa), as indicated by arrow 286. In some examples, the vehicle identification device 285 and the battery identification device 215 may each communicate with the vehicle control unit 110.

In some examples, the interface engine 155, which is operably coupled to, and adapted to be in communication with, the vehicle control unit 110, includes at least one input and output device or system that enables a user to interact with the vehicle control unit 110, AR image projection module 142, and the functions that the vehicle control unit 110 provides.

The interface engine 155 may include a display unit 290 and an input/output ("I/O") device 295. The display unit 290 may be, include, or be part of multiple display units. In some examples, the display unit 290 may include one, or any combination, of a central display unit associated with a dash of the vehicle 105, an instrument cluster display unit associated with an instrument cluster of the vehicle 105, and/or a heads-up display unit associated with the dash and a windshield (e.g., AR windshield) of the vehicle 105; accordingly, as used herein the reference numeral 290 may refer to one, or any combination, of the display units. The I/O device 295 may be, include, or be part of a communication port (e.g., a USB port), a Bluetooth communication interface, a touch-screen display unit, soft keys associated with a dash, a steering wheel, or another component of the vehicle 105, and/or similar components. Other examples of sub-components that may be part of the interface engine 155 include, but are not limited to, audible alarms, visual alerts, telecommunications equipment, and computer-related components, peripherals, and systems.

A portable user device 300 belonging to an occupant of the vehicle 105 may be coupled to, and adapted to be in communication with, the interface engine 155. For example, the portable user device 300 may be coupled to, and adapted to be in communication with, the interface engine 155 via the I/O device 295 (e.g., the USB port and/or the Bluetooth communication interface). In an example, the portable user device 300 is a handheld or otherwise portable device which is carried by a user who is a driver or a passenger on the vehicle 105. In addition, or instead, the portable user device 300 may be removably connectable to the vehicle 105, such as by temporarily attaching the portable user device 300 to the dash, a center console, a seatback, or another surface in the vehicle 105. In another example, the portable user device 300 may be permanently installed in the vehicle 105. In some examples, the portable user device 300 is, includes, or is part of one or more computing devices such as personal computers, personal digital assistants, key fobs, cellular devices, mobile telephones, wireless devices, handheld devices, laptops, audio devices, tablet computers, game consoles, cameras, and/or any other suitable devices. In several examples, the portable user device 300 is a smartphone such as, for example, an iPhone® by Apple Incorporated.

With further reference to FIG. 2, the AR projection system 100 also includes an AR image projection module 142, the operation of which will be described below. In some embodiments, the AR image projection module 142 is communicably coupled to one or more exterior sensors 116 and may also include its own processor and memory. As described herein, the AR image projection module 142 enables the projection of sharp corner images onto rounded corners at roadway intersections. To do so, AR image projection module 142 works in conjunction with an AR device (e.g., AR windshield or HUD) that projects the sharp corner image at the driver's eye point. Once the sensors 116 detect the presence of pedestrian(s) at an intersection as vehicle 105 approaches, AR image projection module 142 then activates the projection of the sharp corner image in the eyesight of the driver. In alternate embodiments, AR image projection module 142 is in communication with AR roadway infrastructure 160 that also has the capability to project the sharp corner image onto the rounded corner at the driver's eye point.

A reader of ordinary skill in the art will understand that other components or arrangements of components may be found in a vehicle 105, and that may of the same general principles apply to electric vehicles, internal combustion vehicles, and hybrid vehicles.

Figure 3A:
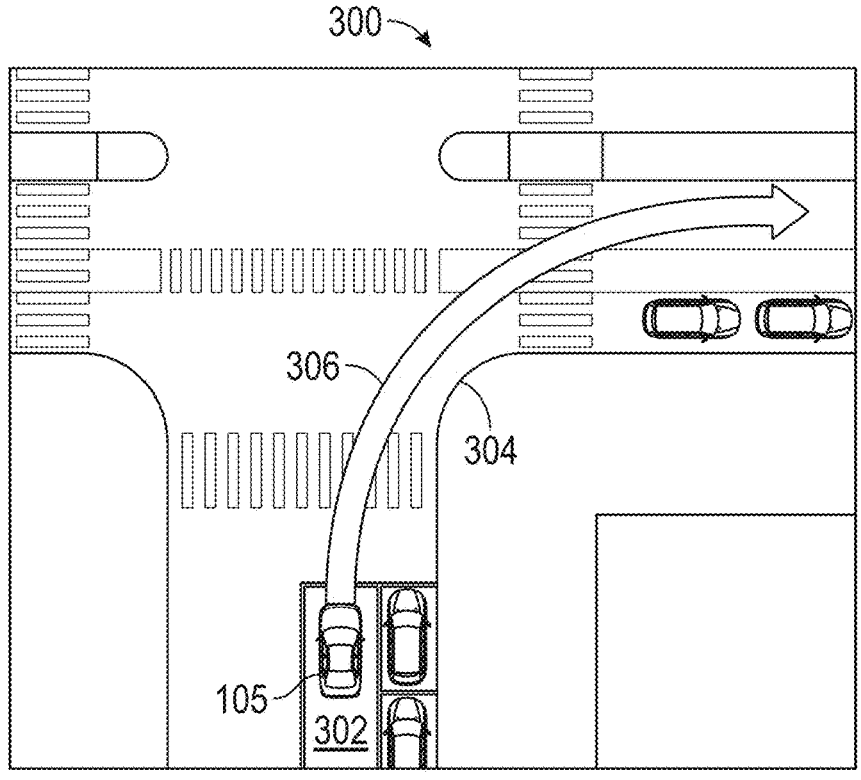
FIG. 3A is an aerial view of a turning lane at an intersection.

FIG. 3A is an aerial view of a turning lane at an intersection. Intersection 300 includes a vehicle 105 in a right-hand turning lane 302. Intersection 300 includes a rounded corner 304 which, as mentioned above, increases the chance of pedestrian accidents or fatalities because the driver tends to take rounded corners at higher speeds and in closer proximity to rounded corner 304, as indicated by turn path 306. However, sharper corners require drivers to slow down and turn more slowly. A recent study has shown that a 30-ft turning radius, for example, vs. a 10-ft turning radius is likely to result in 30% more pedestrian crashes.

Figure 3B:
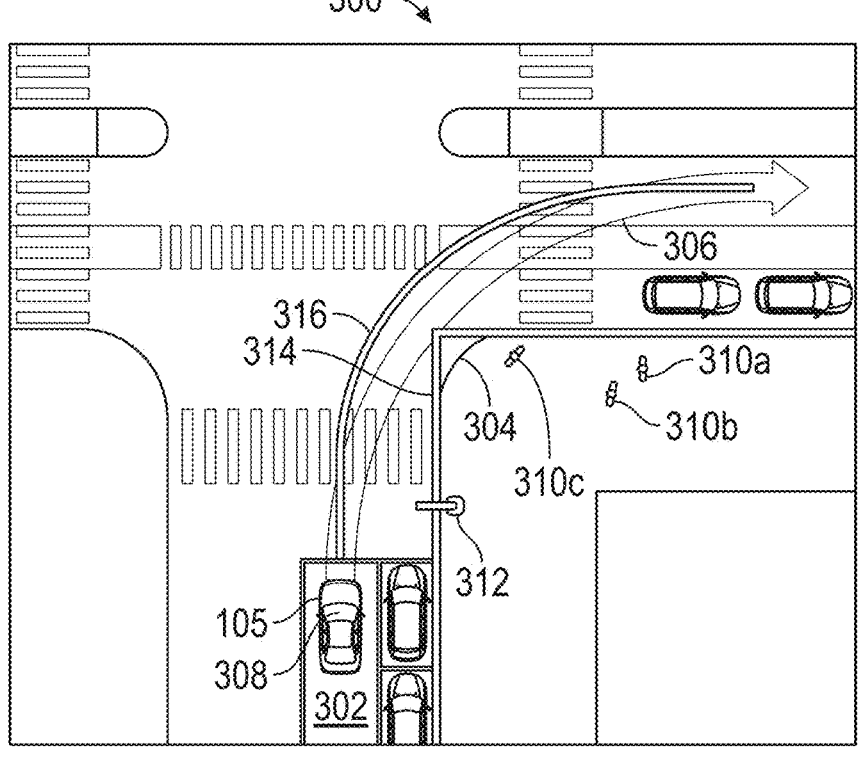
FIG. 3B is an AR aerial view of intersection 300, according to certain illustrative embodiments of the present disclosure.

Accordingly, embodiments of the present disclosure provide systems to project sharp corner images onto the rounded corners 304 via AR enabled windshields or roadway infrastructure (AR devices). FIG. 3B is an AR aerial view of intersection 300, according to certain illustrative embodiments of the present disclosure. In a first example, the AR aerial view of intersection 300 is viewed through an AR windshield 308 of vehicle 105. For ease of understanding, however, AR aerial view of intersection 300 is shown in an aerial view. A number of pedestrians 310*a,b,c*, are shown in proximity to intersection 300. Here, as vehicle 105 approaches intersection 300 in turning lane 302, sensors onboard vehicle 105 and/or roadway infrastructure 312 (e.g., roadway infrastructure 160) detect the presence of pedestrians 310*a,b,c*. In the case roadway infrastructure 312 detects the pedestrian, such detection signal is communicated to AR image projection module 142 over network 130 (e.g., vehicle-to-everything network), as described in relation to FIG. 1.

Nevertheless, once pedestrians 310*a,b,c* are detected, AR image projection module 142 then activates AR windshield 308 to project sharp corner image 314 onto rounded corner 304. As a result, the driver inside vehicle 105 sees the projected sharp corner image 314 from his or her eye point. Thus, the presence of the projected sharp corner image 314 causes the driver to reduce speed and/or widen the turn around sharp corner image 314, thereby resulting in safer turn path 316, thus minimizing the chances for a pedestrian accident.

Still referring to FIG. 3B, in an alternative embodiment, roadway AR infrastructure 312 may also be used to project sharp corner image 314 at the eye point of the driver of vehicle 105. In such examples, not only can roadway AR infrastructure 312 be used to detect the presence of pedestrians 310*a,b,c* (via, e.g., camera, LIDAR, RADAR enables sensors), it also projects the sharp corner image 314 onto rounded corner 304, at the eye point of the driver. Thus, as the driver views the intersection 300 and rounded corner 304 through the windshield (may or may not be AR enabled), AR infrastructure 312 projects the sharp corner image 314 onto the ground atop rounded image 304. As a result, the driver slows down and/or drives vehicle 105 along safer turn path 316. In such examples, AR infrastructure 312 may be a street lamp-mounted projector system, as will be understood by those ordinarily skilled in the art having the benefit of this disclosure.

In yet other illustrative embodiments, AR projection system 100 projects the sharp corner image based upon a risk level assessment of the traffic intersection. In such examples, historic traffic-related data of intersection 300 may be stored on a remote database at central server 125 or locally at vehicle 105. As vehicle 105 approaches intersection 300, historic data is retrieved and analyzed by AR image projection module 142 to determine the risk level of intersection 300. For example, the historic data may be crash data, historic traffic count, etc.

Figure 3C:
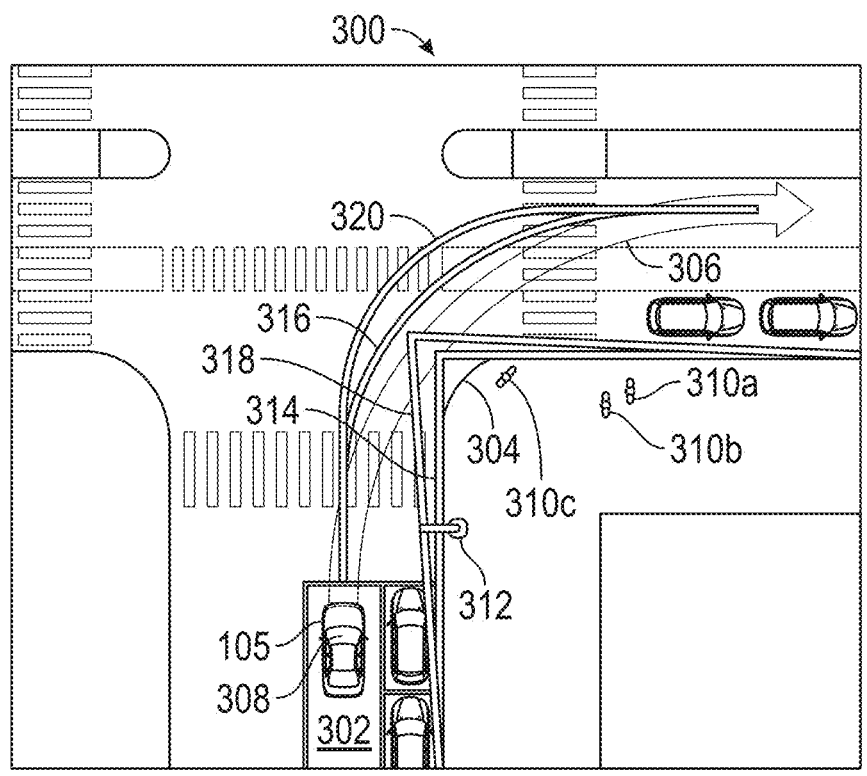
FIG. 3C is another aerial view of the roadway intersection, showing a first sharp corner image and a second sharper corner image, according to certain illustrative embodiments of the present disclosure.

After pedestrians 310*a,b,c* are detected, based upon the assessed risk level, AR image projection module 142 can adjust the sharpness of the projected corner image, accordingly. For example, if AR image projection module 142 determines the risk level of intersection 300 is high, a sharper corner image is projected onto the rounded corner. FIG. 3C is another aerial view of the roadway intersection, showing a first sharp corner image and a second sharper corner image, according to certain illustrative embodiments of the present disclosure. Here, note projected sharp corner image 314 is shown along with sharper projected sharp corner image 318 for illustration purposes only. In this example, based upon a high assessed risk by AR image projection module 142, AR projection system 100 projects, via one of the AR devices, a sharper corner image 318 onto rounded corner 304, thus causing the driver of vehicle 105 to drive it even slower and wider even-safer turn path 320 (as compared to safer turn path 316). Note, in other embodiments, the turn path can be adjusted wider or narrower based upon the assessed risk level.

In other illustrative embodiments, AR projection system 100 adjusts the sharpness of the projected image based upon parameters of the vehicle 105. Such parameters may be, for example, vehicle speed as it approaches the intersection, the number of vehicles proximate the intersection, cruise control status, etc. In the latter case, the sensors on the network 130 may be used to detect the number of vehicles proximate the intersection 300.

In yet other embodiments, AR projection system 100 adjusts the sharpness of the image based upon an attention assessment of the driver. Here, cameras inside the cabin of vehicle 105 (or other suitable sensors) can be used to detect the attention level of the driver via, for example, the driver's gaze, interactions with multimedia screens inside the cabin, etc.

In other embodiments, AR projection system 100 adjusts the sharpness of the image based upon the number of pedestrians at the intersection 300. Although pedestrians 310a,b,c are shown on one side of turning lane 302, note in other examples pedestrians can also be detected on either side of intersection 300 (any area proximate intersection 300). Here, for example, the more pedestrians which are detected results in AR projection system 100 projected a more sharper corner image.

Further, characteristics of the pedestrians may also be used to adjust the risk level. Image recognition techniques may be used to analyze images from camera sensors on network 130, for example. If, for example, AR image projection module 142 determines pedestrians 310c to be elderly, walking with a cane, a stroller, etc. or some other person requiring heightened cautiousness, the risk assessment level is increased to thereby project a corresponding sharper corner image onto rounded corner 304. Here, for example, the risk assessment may be based on an underlying model that considers those pedestrian characteristics. The underlying model could be, for example, a regression equation, DNN (deep neural network), or LSTM (Long Short-Term Memory) model.

In yet other illustrative embodiments, AR projection system 100 adjusts the risk level based upon weather conditions. In such examples, weather conditions at intersection 300 may be detected using local or remote data (e.g., sensors on network 130, weather data accessible by network 130). Based upon the weather (e.g., rain, snow), AR image projection module 142 adjusts the sharpness of the projected sharp corner image.

Furthermore, any variety of aspects of the sharp corner image may be adjusted based upon the assessed risk. In one example, the height of the projected image curb may be adjusted. Here, the height of the projected curb is increased to encourage more cautious driving behavior. In another example, a color of the projected sharp corner image may be adjusted (e.g., red used to make the projected image more obvious). In yet other examples, the angle or texture of the projected sharp corner image can be adjusted (e.g., spiked or striped curb image).

The opacity/transparency of the projected image can also be adjusted. Here, for example, based on the driver's attention, the projected AR image may be 50% transparent or 0% transparent (100% opaque), and so on.

In yet other embodiments, AR projection system 100 can also project other images to affect the speed and path of vehicle 105. For example, the AR devices can project roadside furniture to improve vertical saliency of the projected sharp corner image (to make it more obvious). Such roadside furniture may include, for example, potted plants, a post, etc.

In certain other illustrative embodiments of the present disclosure, AR projection system 100 projects the sharp corner image based upon feedback data from previous trips. For example, each time vehicle 105 turns at an intersection, AR projection system 100 records vehicle related data. Such data may be, for example, the speed at which vehicle 105 took the right-hand turn, how close vehicle 105 was to the rounded curb, etc. Based on this historic trip data, the next time vehicle 105 approaches that same intersection (and pedestrians are detected), AR projection system 100 projects a sharp corner image accordingly. For example, if a first sharp corner image was projected the last time vehicle 105 was at the intersection and the vehicle speed was still recorded as being high, the system may project a second sharper corner image the next time vehicle 105 approaches that same intersection, and so on.

Figure 4:
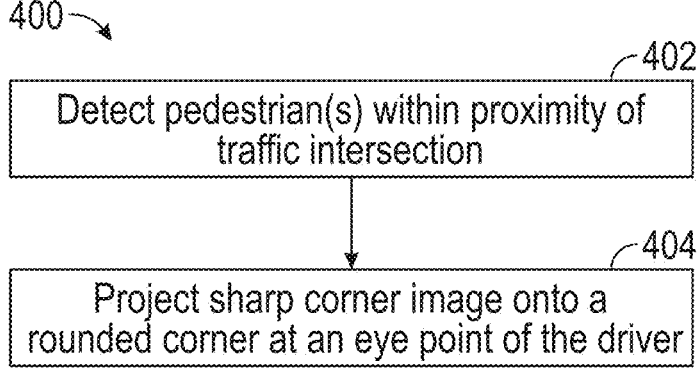
FIG. 4 is a flow chart of a method to provide an augmented view of a turning lane corner for a driver of vehicle, according to certain illustrative embodiments of the present disclosure.

FIG. 4 is a flow chart of a method to provide an augmented view of a turning lane corner for a driver of vehicle, according to certain illustrative embodiments of the present disclosure. At block 402 of method 400, as the vehicle approaches a turn at a rounded corner of a traffic intersection, the system detects the presence of one or more pedestrians within proximity of the intersection. Note, the rounded corner may be a round corner or some other shaped corner which tends to encourage a driver to speed or otherwise take the corner in a dangerous manner. At block 404, based upon the detected presence of the pedestrian, the system projects a sharp corner image onto the rounded corner at an eye point of the driver.

It is noted that flow diagrams are provided herein for exemplary purposes; a person of ordinary skill in the art will recognize myriad variations that nonetheless fall within the scope of the present disclosure. For example, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the steps described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein.

Figure 5:
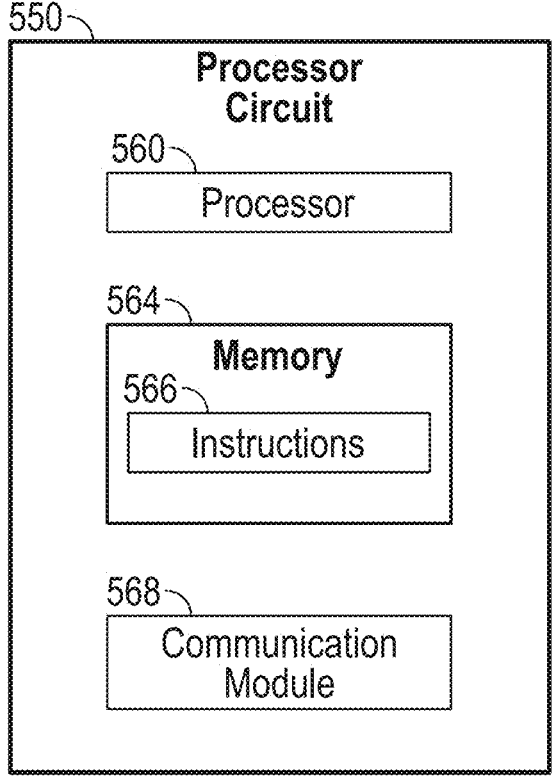
FIG. 5 is a schematic diagram of a processor circuit, in accordance with at least one embodiment of the present disclosure.

FIG. 5 is a schematic diagram of a processor circuit 550, in accordance with at least one embodiment of the present disclosure. The processor circuit 550 may be implemented in the system 100, or other devices or workstations (e.g., third-party workstations, network routers, etc.), or on a cloud processor or other remote processing unit, as necessary to implement the methods described herein. As shown, the processor circuit 550 may include a processor 560, a memory 564 having instructions 566 thereon, and a communication module 568. These elements may be in direct or indirect communication with each other, for example via one or more buses.

The processor 560 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 560 may also comprise another hardware device, a firmware device, or any combination thereof configured to perform the operations described herein. The processor 560 may also be implemented as a combination of computing devices, e.g., a combination of a DSP and a microprocessor, a plurality of microprocessors, one or more microprocessors in conjunction with a DSP core, or any other such configuration.

The memory 564 may include a cache memory (e.g., a cache memory of the processor 560), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 564 includes a non-transitory computer-readable medium. The memory 564 may store instructions 566. The instructions 566 may include instructions that, when executed by the processor 560, cause the processor 560 to perform the operations described herein. Instructions 566 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The communication module 568 can include any electronic circuitry and/or logic circuitry to facilitate direct or indirect communication of data between the processor circuit 550, and other processors or devices. In that regard, the communication module 568 can be an input/output (I/O) device. In some instances, the communication module 568 facilitates direct or indirect communication between various elements of the processor circuit 550 and/or the system 100. The communication module 568 may communicate within the processor circuit 550 through numerous methods or protocols. Serial communication protocols may include but are not limited to United States Serial Protocol Interface (US SPI), Inter-Integrated Circuit (I²C), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, preset sharing between the processor and central server, or readings from vehicle or environmental sensors) may be accomplished using any suitable wireless or wired communication technology, such as a cable interface such as a universal serial bus (USB), micro USB, Lightning, or FireWire interface, Bluetooth, Wi-Fi, ZigBee, Li-Fi, or cellular data connections such as 2G/GSM (global system for mobiles), 3G/UMTS (universal mobile telecommunications system), 4G, long term evolution (LTE), WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

The technology described herein may be implemented on manually controlled vehicles or driver-assist vehicles. The technology may be implemented in diverse combinations of hardware, software, and firmware, depending on the implementation or as necessitated by the structures and modules already present in existing vehicles. The system may be employed on vehicles with automatic transmission, manual transmissions, or vehicles with simulated shifting, including continuously variable transmission (CVT), infinitely variable transmission (IVT), hybrid transmissions (e.g., a hybrid vehicle with 4-speed automatic transmission simulating 10 gears), and fully electric vehicles.

Accordingly, the logical operations making up the embodiments of the technology described herein may be referred to variously as operations, steps, blocks, objects, elements, components, or modules. Furthermore, it should be understood that these may occur or be arranged in any order, unless explicitly claimed otherwise or a specific order is necessitated by the claim language or by the nature of the component or step.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the cargo seat adjustment system. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." Unless otherwise noted in the claims, stated values shall be interpreted as illustrative only and shall not be taken to be limiting.

Methods and embodiments described herein further relate to any one or more of the following paragraphs:

1. A computer-implemented method to provide an augmented view of a turning lane corner for a driver of a vehicle, the method comprising: as the vehicle approaches a turn at a rounded corner of a traffic intersection, detecting a presence of one or more pedestrians within proximity of the intersection; and based upon the detected presence of the pedestrian, projecting a sharp corner image onto the rounded corner at an eye point of the driver.

2. The computer-implemented method as defined in paragraph 1, wherein the sharp corner image is projected in an augmented reality windshield of the vehicle.

3. The computer-implemented method as defined in paragraphs 1 or 2, wherein the sharp corner image is projected from augmented reality infrastructure of the intersection.

4. The computer-implemented method as defined in any of paragraphs 1-3, wherein projecting the sharp corner image comprises: determining a risk level associated with the intersection; and adjusting, based upon the risk level, a degree of sharpness of the projected sharp corner image.

5. The computer-implemented method as defined in any of paragraphs 1-4, wherein the risk level is based upon: historic crash data at the intersection; parameters of the vehicle; or an attention assessment of the driver.

6. The computer-implemented method as defined in any of paragraphs 1-5, wherein the risk level is based upon a number of pedestrians within proximity of the intersection.

7. The computer-implemented method as defined in any of paragraphs 1-6, wherein the risk level is based upon a characteristic of the pedestrians.

8. The computer-implemented method as defined in any of paragraphs 1-7, wherein the risk level is based upon weather data of the intersection.

9. The computer-implemented method as defined in any of paragraphs 1-8, further comprising: capturing data as the vehicle takes the turn; and as the vehicle approaches the intersection at a subsequent time, projecting, based upon the data, a second sharp corner image onto the rounded corner.

10. A system to provide an augmented view of a turning lane corner for a driver of a vehicle, the system comprising: an augmented reality device; and a processor communicably coupled to the augmented reality device, the processor comprising a memory and configured to perform operations comprising: as the vehicle approaches a turn at a rounded corner of a traffic intersection, detecting a presence of one or more pedestrians within proximity of the intersection; and based upon the detected presence of the pedestrian, projecting, using the augmented reality device, a sharp corner image onto the rounded corner at an eye point of the driver.

11. The system as defined in paragraph 10, wherein the augmented reality device is: an augmented reality windshield of the vehicle; or an augmented reality infrastructure of the intersection.

12. The system as defined in paragraphs 10 or 11, wherein projecting the sharp corner image comprises: determining a risk level associated with the intersection; and adjusting, based upon the risk level, a degree of sharpness of the projected sharp corner image.

13. The system as defined in any of paragraphs 10-12, wherein the risk level is based upon: historic crash data at the intersection; parameters of the vehicle; or an attention assessment of the driver.

14. The system as defined in any of paragraphs 10-13, wherein the risk level is based upon: a number of pedestrians within proximity of the intersection; a characteristic of the pedestrians; or weather data of the intersection.

15. The system as defined in any of paragraphs 10-14, further comprising: capturing data as the vehicle takes the turn; and as the vehicle approaches the intersection at a subsequent time, projecting, based upon the data, a second sharp corner image onto the rounded corner.

16. A vehicle, comprising: a processor communicably coupled to an augmented reality device, the processor comprising a memory and configured to perform operations comprising: as the vehicle approaches a turn at a rounded corner of a traffic intersection, detecting a presence of one or more pedestrians within proximity of the intersection; and based upon the detected presence of the pedestrian, projecting, using the augmented reality device, a sharp corner image onto the rounded corner at an eye point of the driver.

17. The vehicle as defined in paragraph 16, wherein the augmented reality device is: an augmented reality windshield of the vehicle; or an augmented reality infrastructure of the intersection.

18. The vehicle as defined in paragraphs 16 or 17, wherein projecting the sharp corner image comprises: determining a risk level associated with the intersection; and adjusting, based upon the risk level, a degree of sharpness of the projected sharp corner image.

19. The vehicle as defined in any of paragraphs 16-18, wherein the risk level is based upon: historic crash data at the intersection; parameters of the vehicle; an attention assessment of the driver; a number of pedestrians within proximity of the intersection; a characteristic of the pedestrians; or weather data of the intersection.

20. The vehicle as defined in any of paragraphs 16-19, further comprising: capturing data as the vehicle takes the turn; and as the vehicle approaches the intersection at a subsequent time, projecting, based upon the data, a second sharp corner image onto the rounded corner Moreover, the methods described herein may be embodied within a system comprising processing circuitry to implement any of the methods, or a in a non-transitory computer-readable medium comprising instructions which, when executed by at least one processor, causes the processor to perform any of the methods described herein.

Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A computer-implemented method to provide an augmented view of a turning lane corner for a driver of a vehicle, the method comprising:
   as the vehicle approaches a turn at a rounded corner of a traffic intersection, detecting a presence of one or more pedestrians within proximity of the intersection; and
   based upon the detected presence of the pedestrian, projecting a sharp corner image onto the rounded corner at an eye point of the driver such that, as the driver looks through a windshield of the vehicle, the sharp corner image is visible on the rounded corner in a line of sight of the driver.

2. The computer-implemented method as defined in claim 1, wherein:
   the windshield is an augmented reality windshield; and
   the sharp corner image is projected by the augmented reality windshield.

3. The computer-implemented method as defined in claim 1, wherein the sharp corner image is projected onto the rounded corner by augmented reality infrastructure of the intersection.

4. The computer-implemented method as defined in claim 1, wherein projecting the sharp corner image comprises:
   determining a risk level associated with the intersection; and
   adjusting, based upon the risk level, a degree of sharpness of the projected sharp corner image.

5. The computer-implemented method as defined in claim 4, wherein the risk level is based upon:
   historic crash data at the intersection;
   parameters of the vehicle; or
   an attention assessment of the driver.

6. The computer-implemented method as defined in claim 4, wherein the risk level is based upon a number of pedestrians within proximity of the intersection.

7. The computer-implemented method as defined in claim 4, wherein the risk level is based upon a characteristic of the pedestrians.

8. The computer-implemented method as defined in claim 4, wherein the risk level is based upon weather data of the intersection.

9. The computer-implemented method as defined in claim 1, further comprising:

capturing data as the vehicle takes the turn; and as the vehicle approaches the intersection at a subsequent time, projecting, based upon the data, a second sharp corner image onto the rounded corner.

10. A system to provide an augmented view of a turning lane corner for a driver of a vehicle, the system comprising:

an augmented reality device; and a processor communicably coupled to the augmented reality device, the processor comprising a memory and configured to perform operations comprising:

as the vehicle approaches a turn at a rounded corner of a traffic intersection, detecting a presence of one or more pedestrians within proximity of the intersection; and based upon the detected presence of the pedestrian, projecting, using the augmented reality device, a sharp corner image onto the rounded corner at an eye point of the driver such that, as the driver looks through a windshield of the vehicle, the sharp corner image is visible on the rounded corner in a line of sight of the driver.

11. The system as defined in claim 10, wherein the augmented reality device is:

the windshield; or an augmented reality infrastructure of the intersection.

12. The system as defined in claim 10, wherein projecting the sharp corner image comprises:

determining a risk level associated with the intersection; and adjusting, based upon the risk level, a degree of sharpness of the projected sharp corner image.

13. The system as defined in claim 12, wherein the risk level is based upon:

historic crash data at the intersection;

parameters of the vehicle; or an attention assessment of the driver.

14. The system as defined in claim 12, wherein the risk level is based upon:

a number of pedestrians within proximity of the intersection;

a characteristic of the pedestrians; or weather data of the intersection.

15. The system as defined in claim 10, further comprising:

capturing data as the vehicle takes the turn; and as the vehicle approaches the intersection at a subsequent time, projecting, based upon the data, a second sharp corner image onto the rounded corner.

16. A vehicle, comprising:

a processor communicably coupled to an augmented reality device, the processor comprising a memory and configured to perform operations comprising:

as the vehicle approaches a turn at a rounded corner of a traffic intersection, detecting a presence of one or more pedestrians within proximity of the intersection; and based upon the detected presence of the pedestrian, projecting, using the augmented reality device, a sharp corner image onto the rounded corner at an eye point of the driver such that, as the driver looks through a windshield of the vehicle, the sharp corner image is visible on the rounded corner in a line of sight of the driver.

17. The vehicle as defined in claim 16, wherein the augmented reality device is:

the windshield; or an augmented reality infrastructure of the intersection.

18. The vehicle as defined in claim 16, wherein projecting the sharp corner image comprises:

determining a risk level associated with the intersection; and adjusting, based upon the risk level, a degree of sharpness of the projected sharp corner image.

19. The vehicle as defined in claim 18, wherein the risk level is based upon:

historic crash data at the intersection;

parameters of the vehicle;

an attention assessment of the driver;

a number of pedestrians within proximity of the intersection;

a characteristic of the pedestrians; or weather data of the intersection.

20. The vehicle as defined in claim 16, further comprising:

capturing data as the vehicle takes the turn; and as the vehicle approaches the intersection at a subsequent time, projecting, based upon the data, a second sharp corner image onto the rounded corner.

\* \* \* \* \*